US012560993B2

(12) United States Patent
Favor et al.

(10) Patent No.: US 12,560,993 B2
(45) Date of Patent: Feb. 24, 2026

(54) POWER MANAGEMENT OF DEVICES WITH DIFFERENTIATED POWER SCALING BASED ON RELATIVE POWER BENEFIT ESTIMATION

(71) Applicant: Ventana Micro Systems Inc., Cupertino, CA (US)

(72) Inventors: John G. Favor, San Francisco, CA (US); Srivatsan Srinivasan, Cedar Park, TX (US)

(73) Assignee: Ventana Micro Systems Inc., Cupertino, CA (US)

( * ) Notice: Subject to any disclaimer, the term of this patent is extended or adjusted under 35 U.S.C. 154(b) by 217 days.

(21) Appl. No.: 18/234,764

(22) Filed: Aug. 16, 2023

(65) Prior Publication Data

US 2025/0021155 A1 Jan. 16, 2025

Related U.S. Application Data

(60) Provisional application No. 63/526,083, filed on Jul. 11, 2023.

(51) Int. Cl.
G06F 1/3296 (2019.01)
G06F 1/3206 (2019.01)

(52) U.S. Cl.
CPC .......... G06F 1/3296 (2013.01); G06F 1/3206 (2013.01)

(58) Field of Classification Search
CPC ....... G06F 1/3296; G06F 1/3206; G06F 1/324
See application file for complete search history.

(56) References Cited

U.S. PATENT DOCUMENTS

| | | | | | |
|---|---|---|---|---|---|
| 5,781,783 | A | * | 7/1998 | Gunther | G06F 1/3287 |
| | | | | | 713/320 |
| 9,477,279 | B1 | * | 10/2016 | Piszczek | G06F 1/206 |
| 9,983,644 | B2 | * | 5/2018 | Zobel | G06F 1/324 |
| 2001/0056456 | A1 | * | 12/2001 | Cota-Robles | G06F 9/3851 |
| | | | | | 718/103 |
| 2007/0043531 | A1 | * | 2/2007 | Kosche | G06F 11/3476 |
| | | | | | 702/182 |
| 2009/0109230 | A1 | * | 4/2009 | Miller | G06F 9/5044 |
| | | | | | 345/506 |

(Continued)

*Primary Examiner* — Faisal M Zaman
(74) *Attorney, Agent, or Firm* — W&T/Qualcomm

(57) ABSTRACT

A power management system with differentiated power scaling including multiple activity monitors and a differentiated power manager. Each activity monitor counts performance benefit estimation events of each of multiple devices to determine performance benefit estimate values, each being a measure of relative power utilization efficiency of a corresponding device. The differentiated power manager periodically evaluates the performance benefit estimate values and dynamically adjusts relative power provided to each device to achieve differentiated power scaling based on the performance benefit estimate values. Additional power available during a higher performance mode may be distributed only to those devices with higher performance benefit estimate values. During any mode of operation, the power provided to those devices with lower performance benefit estimate values may be redirected to those devices with higher performance benefit estimate values. Power may thus be distributed in an unequal manner to benefit those devices operating at higher efficiency.

31 Claims, 9 Drawing Sheets

(56) References Cited

U.S. PATENT DOCUMENTS

| | | | | |
|---|---|---|---|---|
| 2010/0313044 A1* | 12/2010 | Rajpal | G06F 1/3287 | |
| | | | 710/33 | |
| 2012/0137158 A1* | 5/2012 | Nelluri | H05K 7/1498 | |
| | | | 713/340 | |
| 2012/0260117 A1* | 10/2012 | Acar | G06F 1/3243 | |
| | | | 713/340 | |
| 2012/0324248 A1* | 12/2012 | Schluessler | G06F 9/5094 | |
| | | | 713/300 | |
| 2013/0138981 A1* | 5/2013 | Wang | G06F 1/3206 | |
| | | | 713/300 | |
| 2014/0189301 A1* | 7/2014 | Gorbatov | G06F 9/5094 | |
| | | | 712/30 | |
| 2015/0323981 A1* | 11/2015 | Yarvis | G06F 1/3212 | |
| | | | 713/323 | |
| 2015/0347138 A1* | 12/2015 | Gschwind | G06F 9/467 | |
| | | | 712/239 | |
| 2021/0064109 A1* | 3/2021 | Tandon | G06F 1/263 | |
| 2021/0064117 A1* | 3/2021 | Liu | G11C 7/1075 | |
| 2023/0092988 A1* | 3/2023 | Sama | G06F 1/3234 | |
| | | | 713/320 | |
| 2023/0297432 A1* | 9/2023 | Whatmough | G06F 1/3234 | |
| | | | 718/104 | |

* cited by examiner

| PCE EVENT NUMBER | EVENT NAME | EVENT DESCRIPTION |
|---|---|---|
| C1 | FBLKP | Indicates that the fetch block was predicted |
| C2 | FBLK2 | Fetch block fetched from IL2 |
| C3 | NOPS | Number of Ops decoded and dispatched  (0 – 4) |
| C4 | IRBXOP | Number of register or branch Ops issued from IXU scheduler (0 – 4) |
| C5 | ILOP | Number of load Ops issued from LSU scheduler (0 – 4) |
| C6 | ISOP | Number of store Ops issued from LSU scheduler (0 – 4) |
| C7 | IRBFOP | Number of register or branch Ops issued from FPU scheduler (0 – 2) |
| C8 | ORISC | Aggregate of outbound requests from IL2 and DL2 and inbound snoops |
| C9 | DL2PRP | DL2 pipleline request processed |
| C10 | TWP | Number of tablewalk processes initiated by TW Engine (0-2) |

*FIG. 10*

| PBE EVENT NUMBER | EVENT NAME | EVENT DESCRIPTION |
|---|---|---|
| B1 | FBLKP | Indicates that the fetch block was predicted |
| B2 | NOPS | The number of Micro-ops (Ops) decoded and dispatched for execution (0 − 4) |
| B3 | ABORT | Abort initiated including both front and backend aborts |
| B4 | DL2WRP | DL2 Write-related pipeline request processed |
| B5 | DL2NWRP | DL2 Non-write-related pipeline request processed, including demand and prefetch read requests and snoops |
| B6 | TWP | Number of tablewalk processes initiated by TW Engine (0-2) |
| B7 | DL2CFWC | DL2 cache fill from L3 or DL2 within a cluster of cores |
| B8 | DL2CFNWC | DL2 cache fill from external memory outside the cluster of cores |
| B9 | IL2CFWC | IL2 cache fill from L3 or DL2 within a cluster of cores |
| B10 | IL2CFNWC | IL2 cache fill from memory outside the cluster of cores |

*FIG. 11*

POWER MANAGEMENT OF DEVICES WITH DIFFERENTIATED POWER SCALING BASED ON RELATIVE POWER BENEFIT ESTIMATION

BACKGROUND OF THE INVENTION

Field of the Invention

The present invention relates in general to power management for multiple devices, and more particularly to differentiated power scaling based on relative performance benefit estimation.

Description of the Related Art

Semiconductor manufacturers often specify a thermal design power (TDP) factor for a semiconductor device or integrated circuit (IC) or chip or the like. The TDP factor specifies a maximum amount of heat generated by a chip, usually specified units of power (e.g., Watts), which informs a system designer how much power the cooling system has to dissipate to avoid overheating. Various methods are known for estimating how much power is being consumed by each of the devices on the chip. An assumption is made that the amount of power consumed is roughly equivalent to the amount of heat produced. In this manner, a power consumption estimate may be determined and adjusted over time while remaining within the TDP specification.

A power controller may be provided that estimates the amount of power being consumed and that dynamically scales operating frequency and/or voltage (DVFS) up or down to adjust performance. A nominal frequency level and nominal voltage level may be used during a normal mode of operation. The frequency and/or voltage may be reduced for a low power mode. When higher performance is desired, commonly called "turbo" mode or the like, the power may be increased. Conventionally, the aggregate power level of the chip is increased on the entire chip in a uniform manner without exceeding the TDP specification during the higher performance mode of operation.

SUMMARY OF THE INVENTION

A power management system with differentiated power scaling according to one embodiment includes at least one activity monitor and a differentiated power manager. Each activity monitor counts performance benefit estimation events of each of multiple devices to determine performance benefit estimate values, in which each performance benefit estimate value is a measure of relative power utilization efficiency of a corresponding device. The differentiated power manager periodically evaluates the performance benefit estimate values and dynamically adjusts relative power provided to each device to achieve differentiated power scaling based on the performance benefit estimate values.

The differentiated power manager may be configured to distribute additional power during a higher performance mode of operation only to those devices with higher performance benefit estimate values. The differentiated power manager may further be configured to decrease power provided to those devices with lower performance benefit estimate values to recapture a power amount, and to redistribute the recaptured power amount to those devices with higher performance benefit estimate values during the higher performance mode of operation. The differentiated power manager may be configured to redistribute a current level of available power by decreasing power provided to those devices with lower performance benefit estimate values while increasing power provided to those devices with higher performance benefit estimate values.

Each of one or more activity monitors may be configured to count each performance benefit estimation event during each of sequential sampling intervals and to multiply each of multiple accumulated counts by a corresponding one of multiple coefficients to provide a corresponding one of multiple performance benefit estimate update values. Each performance benefit estimate update value is used to update a corresponding performance benefit estimate value.

Each activity monitor may include an activity detector, a selector, and an adder. The activity detector detects occurrences of the performance benefit estimation events during each clock cycle and provides multiple detect signals indicative thereof. The selector selects a number of detected ones of the coefficients based on the detect signals and provides a selected number of coefficient values. The adder accumulates the selected number of coefficient values during each clock cycle into a counter that holds a corresponding one of multiple performance benefit estimate update values. A timer may be included that provides a signal to transfer the corresponding performance benefit estimate update value accumulated in the counter into a corresponding one of multiple output registers for each of successive sample intervals. The differentiated power manager may combine one of the performance benefit estimate update values with a corresponding one of the performance benefit estimate values during each of successive polling intervals. The combining may be according to a moving average function.

Each of the performance benefit estimation events of each of the devices may be counted and weighted for each of sequential sampling intervals to provide multiple sequential series of performance benefit estimate update values including a sequential series of performance benefit estimate update values for each device. Each performance benefit estimate value may be a moving average of a corresponding one of the multiple sequential series of performance benefit estimate update values.

The differentiated power manager may normalize the performance benefit estimate values based on a selected scale and distribute available power based on the normalized values. The differentiated power manager may group the performance benefit estimate values into bins from lowest to highest separated corresponding thresholds and distribute available power based on binned information. The differentiated power manager may rank the performance benefit estimate values from lowest to highest and distribute available power based on ranked information.

The devices may be cores of a multi-core system, in which the performance benefit estimation events may include at least one event performed by a prediction unit, may include a number of micro-ops that have been decoded and dispatched for execution, may include an abort operation, may include at least one event associated with a table walk engine, may include at least one cache fill related event, etc. The devices may also include non-core type devices.

A method of managing power provided to multiple devices using differentiated power scaling according to one embodiment includes counting performance benefit estimation events of each device for determining performance benefit estimate values each being a measure of relative power utilization efficiency of a corresponding device, and periodically evaluating the performance benefit estimate values and dynamically adjusting relative power provided to each device to achieve differentiated power scaling based on the performance benefit estimate values.

The method may include distributing additional power during a higher performance mode of operation only to those devices with higher performance benefit estimate values. The method may include decreasing power provided to those devices with lower performance benefit estimate values to recapture a power amount, and redistributing the recaptured power amount to those devices with higher performance benefit estimate values during the higher performance mode of operation.

The method may include redistributing a current level of available power by decreasing power provided to those devices with lower performance benefit estimate values while increasing power provided to those devices with higher performance benefit estimate values.

The method may include counting each of multiple performance benefit estimation events during each of sequential sampling intervals, multiplying each of multiple accumulated counts by a corresponding one of multiple coefficients to provide a set of performance benefit estimate update values, and using the corresponding performance benefit estimate update values to update a corresponding performance benefit estimate values.

The method may include detecting occurrences of the performance benefit estimation events during each clock cycle and providing corresponding detect signals indicative thereof, selecting a number of detected coefficients based on the detect signals and providing a selected number of coefficient values, and accumulating the selected number of coefficient values during each clock cycle into a counter that holds a corresponding performance benefit estimate update value. The method may include transferring the corresponding performance benefit estimate update value accumulated in the counter into a corresponding one of multiple output registers for each of successive sample intervals. The method may include combining one of the performance benefit estimate update values with a corresponding performance benefit estimate values during each of successive polling intervals, which may be according to a moving average function. The method may include counting and weighting performance benefit estimation events over sequential sampling intervals to provide a corresponding one of a multiple performance benefit estimate update values for each device, and calculating each performance benefit estimate value as a moving average of corresponding performance benefit estimate update values.

The method may include determining a moving average of performance benefit estimation events counted for a corresponding device. The method may include normalizing the performance benefit estimate values based on a selected scale into normalized values, and distributing available power based on the normalized values. The method may include grouping the performance benefit estimate values into multiple bins from lowest to highest separated by corresponding thresholds and distributing available power based on binned information. The method may include ranking the performance benefit estimate values from lowest to highest, and distributing available power based on ranked information.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 10 is a tabular diagram listing an exemplary set of power consumption estimate (PCE) events that may be monitored and counted for determining a power consumption estimate for each of the cores of FIG. 1 according to one embodiment.

FIG. 11 is a tabular diagram listing an exemplary set of performance benefit estimate (PBE) events that may be monitored and counted for determining a performance benefit estimate for each of the cores of FIG. 1 according to one embodiment.

DETAILED DESCRIPTION

A power management system with differentiated power scaling for multiple devices as described herein includes a power management system that provides power to each device, at least one activity monitor that is configured to count performance benefit estimation events of each device to determine a set of performance benefit estimate values, and a differentiated power manager that is configured to periodically evaluate the performance benefit estimate values. Each performance benefit estimate value is a measure of relative power utilization efficiency of a corresponding device. The differentiated power manager is configured to dynamically adjust relative power provided to each of the devices to achieve differentiated power scaling based on evaluation of the performance benefit estimate values. In one embodiment, for example, the differentiated power manager may normalize the performance benefit estimate values relative to a scale to identify those devices that may benefit the most from an increase in power, and/or to identify those devices utilizing power less efficiently such that power to those devices may be decreased.

The performance benefit estimation values may indicate an estimate of the relative power efficiency of each device, which can then be used to estimate a relative improvement in performance of each device that may be achieved in response to an increase in power. A mode value may be received which indicates any one of multiple operating modes, such as a normal mode or a high performance mode, among others. During a normal operating mode when it may be desired to keep the power level at a normal or nominal target level, those devices with higher performance benefit estimates may receive corresponding increases in power, whereas those devices with lower performance benefit estimates may either not receive additional power or may even receive corresponding decreases in power to improve overall power utilization efficiency while roughly maintaining the normal operating power level. When the mode value indicates a desire to increase performance, such as when transitioning to a high power mode of operation or the like, those devices with higher performance benefit estimate values may receive a higher percentage of the power increase relative to other devices with lower performance benefit estimate values.

Figure 1:
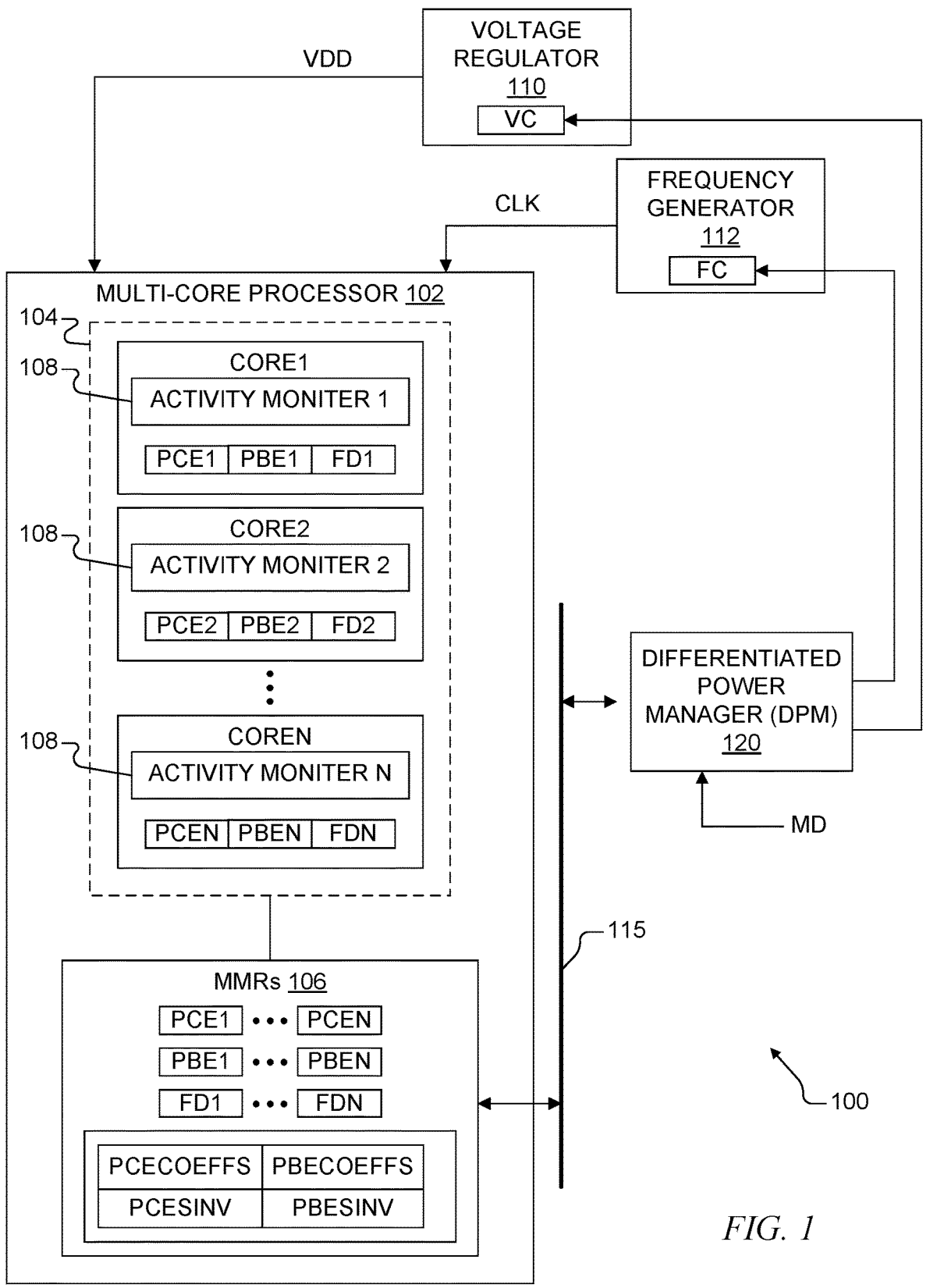
FIG. 1 is a simplified block diagram of a multi-core processing system configured with differentiated power scaling based on relative power benefit estimation according to one embodiment.

FIG. 1 is a simplified block diagram of a multi-core processing system 100 configured with differentiated power scaling based on relative power benefit estimation according to one embodiment. A multi-core processor 102 includes a set of N cores 104, individually labeled CORE1, CORE2, . . . , COREN, and a set of memory-mapped registers (MMRs) 106. A core is a processor or processing device configured to execute instructions or the like and usually contains one or processing pipelines. Although processing cores are shown, other types of processing devices are contemplated, such as processors, microprocessors, central processing units (CPUs), microcontroller units (MCUs), and so on. Each of the cores 104 includes a corresponding one of a set of N activity monitors 108, individually labeled activity monitor 1, activity monitor 2, . . . , activity monitor N. The MMRs 106 include a set of N power consumption estimate (PCE) registers, individually labeled PCE1, PCE2, . . . PCEN, which includes a PCE register for each of the cores 104. The MMRs 106 include a set of N performance benefit estimate (PBE) registers, individually labeled PBE1, PBE2, . . . PBEN, which includes a PBE register for each of the cores 104. The MMRs 106 include a set of N frequency divider (FD) registers, individually labeled FD1, FD2, . . . FDN, which includes an FD register for each of the cores 104, for storing a corresponding one of FD values FD1-FDN (collectively referred to as FDx in which "x" is an index from 1 to N). Respective ones of the PCE, PBE, and FD registers are also shown individually distributed among the cores 104 for purposes of illustration. The MMRs 106 include a set of power consumption estimate coefficients PCECOEFFS, a set of performance benefit estimate coefficients PBECOEFFS, a power consumption estimate sampling interval (PCESINV) register for storing a PCESINV value, and a performance benefit estimate sampling interval (PBESINV) register for storing a PBESINV value.

The multi-core processor 102 interfaces a register bus 115 which is configured as a communication network that provides access to MMRs in system address space including the MMRs 106 of the multi-core processor 102. A differentiated power manager (DPM) 120 is shown interfacing the register bus 115 for the purpose of accessing MMRs including the MMRs 106 of the multi-core processor 102. Upon power-up or reset (POR), the DPM 120 writes a set of power consumption estimate coefficients into the PCECOEFFS registers, writes a set of performance benefit estimate coefficients into the PBECOEFFS registers, writes a PCESINV value into the PCESINV register, and writes a PBESINV value into the PBESINV register.

A voltage regulator 110 provides a supply voltage VDD to the multi-core processor 102. A frequency generator 112 provides a clock signal CLK at a selected frequency to the multi-core processor 102. The voltage regulator 110 uses a voltage control (VC) value to set the voltage level of VDD, and the frequency generator 112 uses a frequency control (FC) value to set the frequency level of CLK. During operation, the DPM 120 periodically adjusts the VC and FC values to control the supply voltage level and the clock frequency level of the multi-core processor 102. It is appreciated that individual voltage regulators or voltage dividers may be distributed among the cores 104 of the multi-core processor 102. In the illustrated embodiment, however, each of the cores 104 receives and operates using the same voltage level determined by VDD. Each of the cores 104 includes a frequency divider (not shown) that divides the frequency of CLK based on a corresponding one of the frequency divider values FDx.

The DPM 120 receives a mode (MD) value indicative of a desired operating mode, such as, for example, a normal mode, a low power mode, and a high performance mode (e.g., "turbo" mode), among other possible modes of operation. During operation, the DPM 120 can control the power level of each of the cores 104 based on the mode of operation indicated by the MD value among other factors. The DPM 120 adjusts the power level by controlling the VC and FC values to adjust the global voltage and clock frequency of the multi-core processor 102, and by writing the frequency divider values FDx to control the relative frequency of operation of each of the cores 104.

After POR of the multi-core processing system 100 including the multi-core processor 102, each of the cores 104 may perform preliminary functions and then may commence normal operations which includes performing a set of activities or events. During operation, each activity monitor 108 accumulates a count of a set of power consumption estimate events of a corresponding core 104 during each of consecutive power consumption estimate sampling intervals defined by PCESINV and updates a corresponding one of the PCE registers. In addition, each activity monitor 108 accumulates a count of performance benefit events of a corresponding core 104 during each of consecutive performance benefit sampling intervals defined by PBESINV and updates a corresponding one of the PBE registers. In the illustrated embodiment, the DPM 120 periodically polls the PCE1-PCEN registers and the PBE1-PBEN registers to capture power consumption and performance benefit estimate values for each of the sampling intervals. The DPM 120 accumulates the power consumption and performance benefit estimation information over time and determines corresponding moving averages or the like, and then adjusts the VC, PC and FDx values to adjust the power level of each of the cores 104 based on the mode of operation.

In an alternative configuration, the multi-core processor 102 may be configured to generate at least one interrupt invoking the DPM 120 to read the PCE1-PCEN or the PBE1-PBEN registers. Either a single general interrupt may be defined or multiple interrupts may be generated, such as the loading of any one or any predefined number of the PCE1-PCEN or the PBE1-PBEN registers. In either case, an appropriate interrupt process and routine is performed for reading the PCE and PBE registers to capture the count information. The interrupt embodiment is not further described herein.

The performance benefit estimation information indicates an estimate of the relative power efficiency of the cores 104, which can then be used to estimate a relative improvement in performance of each core that may be achieved in response to an increase in power. During a normal operating mode when it may be desired to keep the power level at a normal or nominal target level, those cores with higher PBE values may receive corresponding increases in power, whereas those cores with lower PBE values may receive corresponding decreases in power to improve overall power utilization efficiency while roughly maintaining the normal operating power level. When the MD value indicates a desire to increase performance, such as when transitioning to a high power mode of operation or the like, those cores with higher PBE values may receive a higher percentage of the power increase relative to other cores with lower PBE values.

Figure 2:
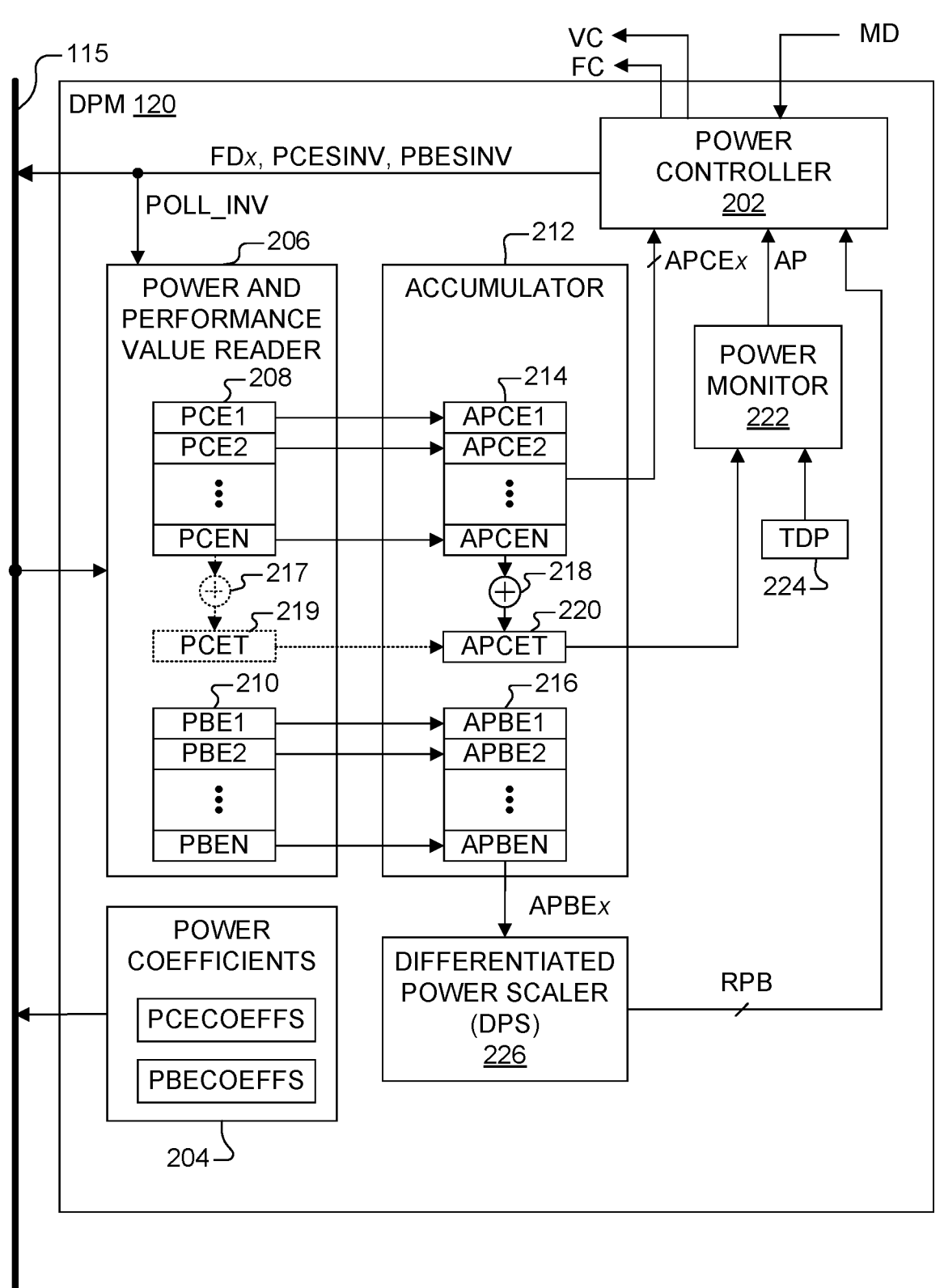
FIG. 2 is a more detailed block diagram of the differentiated power manager (DPM) of FIG. 1 according to one embodiment.

FIG. 2 is a more detailed block diagram of the DPM 120 implemented according to one embodiment. Upon POR, a power controller 202 may output initial VC. FC, and FDx values to establish an initial voltage level of VDD, an initial frequency level of CLK, and initial frequency divider values for each of the cores 104 of the multi-core processor 102. These initial values may be predetermined and/or pre-stored to establish initial operating parameters. The power controller 202 receives the MD value for controlling the power level based on the indicated mode of operation. The DPM 120 accesses or otherwise stores a set of power coefficients 204, including the power consumption estimate coefficients PCECOEFFS and the performance benefit estimate coefficients PBECOEFFS. These coefficients may be empirically determined before-hand during performance testing or the like and are generally constant or otherwise fixed for a given configuration. These coefficients may vary from one configuration to another, from one application to another, from one customer or another based on customer needs or specifications, etc. Upon POR, these coefficients may be retrieved from non-volatile memory or the like and written to the corresponding PCECOEFFS and PBECOEFFS registers of the MMRs 106 as previously described.

The power controller 202 may further communicate with a power monitor 222 and/or other circuitry to determine sampling and polling intervals for collecting power activity information from the cores 104 of the multi-core processor 102. The power controller 202 writes sampling interval values to the PCESINV and the PBESINV registers of the MMRs 106 of the multi-core processor 102 to establish power consumption estimate and performance benefit estimate sampling intervals. The power controller 202 may also determine a corresponding polling interval (POLL_INV) value used by a power and performance value reader 206. It is noted that the PCE and PBE sampling intervals are generally equal and that the polling interval may be the same or less than the sampling intervals to ensure that the DPM 120 gathers the sampled information in time to reduce potential of overflow by activity monitors of the cores 104.

After the cores 104 of the multi-core processor 102 begin normal operation, the activity monitors 108 of the cores 104 begin counting events indicative of power consumption and performance benefit and begin writing to the PCE1-PCEN and PBE1-PBEN registers of the MMRs 106. The power and performance value reader 206 polls the PCE1-PCEN registers of the MMRs 106 and retrieves the corresponding values as shown at 208. The power and performance value reader 206 also polls the PBE1-PBEN registers of the MMRs 106 and retrieves the corresponding values as shown at 210. The values shown at 208 and 210 may be temporarily stored in registers or memory locations or the like. Alternatively, each of the values shown at 208 and 210 are not actually stored but are instead provided to an accumulator 212 which maintains a moving average of each of the values as shown at 214 and 216, respectively. In particular, the PCE1, PCE2, . . . , PCEN values accumulated into moving power consumption estimate averages APCE1, APCE2, . . . , APCEN, respectively shown at 214, and the PBE1, PBE2, . . . , PBEN values accumulated into moving performance benefit estimate averages APBE1, APBE2, . . . , APBEN, respectively, shown at 216. The values shown at 214 and 216 may be stored in registers or memory locations or the like controlled by or otherwise accessible to the accumulator 212.

It is noted that the "moving" averages (which may otherwise be known as "running" or "rolling" averages) shown at 214 and 216 may each have at least one associated time interval in which older values are removed while newer values are added to the averages over time. Although only one moving average appears to be shown for each of the cores 104, it is understood that multiple moving averages may be determined and used for different purposes based on different time intervals. Moving averages with shorter time intervals change more quickly over time as compared to moving averages with longer time intervals. Moving averages with shorter time intervals, for example, may be used to identify dynamically changing power consumption estimates and/or performance benefit estimates during changing power conditions.

The accumulated set of moving average power consumption estimates per core (APCEx) values shown at 214 may be provided or otherwise made available to the power controller 202. It is noted that some of the cores 104 may be executing higher priority or even critical applications that require more power over than the other cores 104 during the normal operating mode, in which the power controller 202 may adjust relative average power accordingly. The APCEx values shown at 214 may also be added together by an adder 218 or the like to generate a total power consumption estimate APCET value 220, which is provided to the power monitor 222. The power monitor 222 compares the APCET value 220 with a thermal design power (TDP) factor 224 to determine an available power (AP) value provided to the power controller 202. The AP value indicates a power headroom parameter relative to the TDP factor 224 which may be used by the power controller 202 to determine by how much the power of the multi-core processor 102 may be increased before exceeding the TDP factor 224.

In an alternative embodiment, the PCE1-PCEN values may be added together (or accumulated as received) as represented by an adder 217 into a power consumption estimate total (PCET) value 219, which is instead incorporated into the APCET value 220. The PCET value 219 determined per polling interval may have an advantage of conveying any sudden increases in power consumption that might otherwise be somewhat obscured by moving averages depending upon the moving average time interval. It is noted, however, that other power monitoring circuitry may be provided (not shown) that detects any excessive increases in power and that throttles power consumption accordingly.

The accumulated set of moving average performance benefit estimates per core (APBEx) values shown at 216 may be provided to a differentiated power scaler (DPS) 226. The DPS 226 evaluates the APBEx values and outputs a set of relative performance benefit (RPB) values to the power controller 202. The set of RPB values indicates relative performance benefit for each of the cores 104, meaning which of the cores 104 would benefit more (or the most) from an increase in power, and possibly which the cores 104 may be consuming power inefficiently such that power may be reduced without significant detrimental impact to operation. The power controller 202 uses the RPB values to redistribute power at a current power consumption level or to distribute increased power to achieve higher or highest efficiency of operation at any power level.

In one embodiment, the RPB values may simply be a ranking of the APBEx values from highest to lowest. The power controller 202 may use the rankings indicated by the RPB values to redistribute available power by increasing power provided to those cores 104 with higher rankings and possibly by decreasing power provided to those cores 104 with lower rankings. For example, at a current power consumption level, power may be taken from those with lower rankings and given to those with higher rankings. When a higher power mode or higher performance mode is indicated such that additional power is available, the power controller 202 may distribute the additional power by increasing power provided to those cores 104 with the highest rankings. Even when additional power is available, the power provided to those with lower rankings may be reduced and redistributed to those with higher rankings.

In another embodiment, the DPS 226 may group the APBEx values into multiple bins, such as a "high" bin identifying those cores 104 having APBEx values at or above (or simply above) a high threshold, a "low" bin identifying those cores 104 having APBEx values at or below (or simply below) a low threshold, and a "mid" bin identifying those cores 104 between the low and high thresholds (set inclusive or not). The bins may be simplified to only two bins (e.g., either high or low) or may be expanded to any suitable number of bins and corresponding thresholds. The power controller 202 may redistribute power by increasing power provided to those cores 104 in a higher bin and by reducing power provided to those cores 104 in lower bins. When a higher power mode or higher performance mode is indicated, the power controller 202 may simply increase power provided to one or more cores 104 in the high bin (or in higher bins) and possibly one or more cores 104 in the mid bin (or in each of one or more middle bins). Even when additional power is available, the power provided to those with lower rankings may be reduced and redistributed to those with higher rankings.

In yet another embodiment, the DPS 226 may perform statistical analysis of the APBEx values for providing a more sophisticated redistribution of available power. Such analysis may include, for example, normalization of the APBEx values based on a selected scale into normalized values, such as a scale from 0 to 1 or based on a percentage scale, such as from 0% to 100%. The scale may be a linear scale or may be a nonlinear scale, such as a logarithmic scale or the like. Such normalization and/or scaling may be used to determine which cores 104 would benefit the most from increased power and by how much, and/or which cores 104 would not be significantly impacted by decreased power and by how much. In this embodiment, the RPB values may be configured accordingly to identify cores 104 eligible for increased power and by how much (relatively speaking), and to identify any of the cores 104 in which power may be decreased (relatively speaking) and by how much. The power controller 202 uses the RPB values to redistribute available or additional power equally or unequally to the cores 104 to optimize power utilization efficiency.

In one embodiment, the RPB values may be statistically distributed in such a manner to enable an unequal distribution of power on a percentage basis such that some devices may receive a greater percentage increase in power as compared to other devices. The power controller 202 uses the RPB values to perform differentiated power scaling, which essentially means unequal power distribution or redistribution of available power between the devices. Differentiated power scaling may thus be used to identify those devices operating with greater power efficiency that would benefit the most from an increase in power, to identify those devices operating with the least power efficiency such that power may be decreased without significant negative impact on operation, and possibly to identify those devices operating at a suitable power level such that power may remain unmodified.

For a given level of power consumption, for example, the power controller 202 may reduce the power provided to those cores with lower (or the lowest) RPB values and redirect recaptured power to those cores 104 with higher (or the highest) RPB values while roughly maintaining the same level of power consumption. When it is desired to increase overall performance, such as by switching to a higher performance mode (e.g., turbo mode) or the like as indicated by the MD value, the power controller 202 may increase power consumption by the amount of available power indicated by the AP value up to the TDP factor. Rather than distributing the available extra power equally, the power controller 202 distributes additional power unequally based on the RPB values. In some cases when power is increased for a higher performance mode, the power provided to some cores 104 may still be decreased to optimize overall power distribution to the cores 104 while staying within the maximum power consumption level indicated by the TDP factor.

The format of the RPB values may depend on the particular configuration of the DPS 226. For example the RPB values may be a simple performance benefit ranking of the cores 104, or identification of which cores 104 belong to which of multiple bins, or identification of a scaled or normalized power benefit distribution of the cores 104. In any of these cases when adjusting or redistributing power among the cores 104, the power controller 202 adjusts the FDx values and adjusts the VC value if necessary to achieve the desired overall power distribution.

Figure 3:
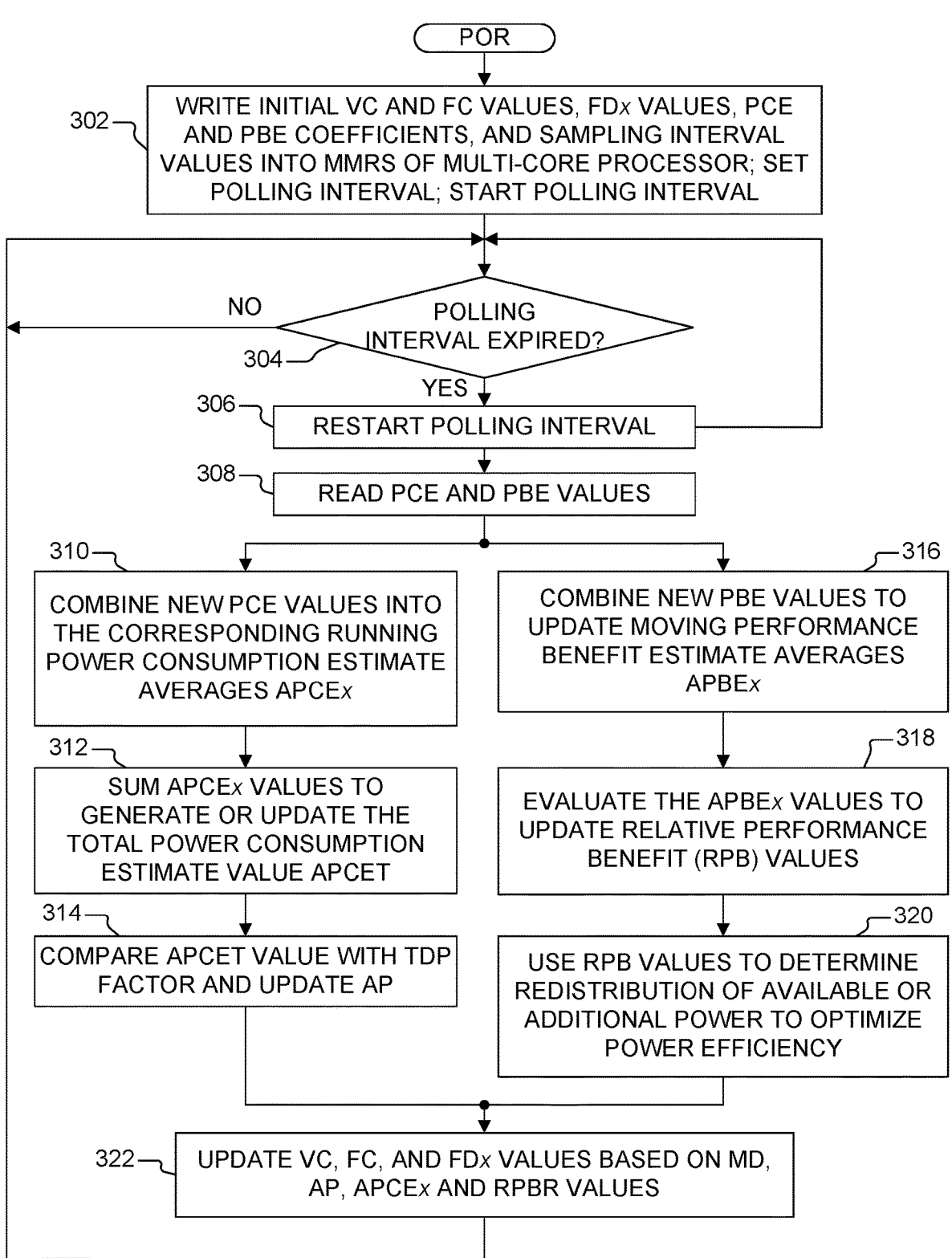
FIG. 3 is a flowchart diagram illustrating operation of the DPM of FIG. 2 according to one embodiment.

FIG. 3 is a flowchart diagram illustrating operation of the DPM 120 implemented according to one embodiment. Upon POR, the initial VC and FC values are written into the voltage regulator 110 and the frequency generator 112 to establish an initial voltage level of VDD and an initial frequency of CLK as previously described. In addition, initial FDx values are written into corresponding FDx registers of the MMRs 106. It is noted, however, that the voltage regulator 110 and/or the frequency generator 112 may incorporate default values or otherwise access initial values from other power control circuitry (not show) upon POR, in which the DPM 120 is configured to update the VC and FC values during operation. Similarly, the multi-core processor 102 may incorporate default FDx values or otherwise access initial values from the other power control circuitry upon POR, in which the DPM 120 is configured to update the FDx values during operation. The power controller 202 (or other functional blocks or circuitry) writes the initial sampling intervals PCESINV and PBESINV into the MMRs 106 and sets the polling interval value POLL_INV accessible to the power and performance value reader 206.

The polling interval may then be started, such as starting a polling timer or counter or the like (not shown).

At next block 304, it is queried whether the polling interval has expired, such as timeout of the polling timer or other indication by a polling counter or the like. Operation loops at block 304 until the polling interval expires, and then advances to block 306 in which the polling interval is restarted, and then loops back to block 304. After the polling interval is restarted, operation also advances to block 308 in which the power and performance value reader 206 polls the PCE (PCE1-PCEN) and PBE (PBE1-PBEN) values from the MMRs 106 of the multi-core processor 102 as shown at 208 and 210, respectively. At a next block 310, the accumulator 212 combines the newly retrieved PCE values into the moving power consumption estimate averages APCEx. At next block 312, the APCEx values are summed to update the total power consumption estimate APCET value 220. At next block 314, the APCET value 220 is compared with the TDP factor 224 and the AP value is updated accordingly. As previously described, the AP value indicates the relative power headroom that may be available relative to the TDP factor for increasing power for a higher performance operating mode (e.g., turbo mode or the like).

After the PBE values are read at block 308, operation also advances to block 316 in which the newly retrieved PBE values are combined by the accumulator 212 to update moving performance benefit estimate averages APBEx. At next block 318, the APBEx values are provided to and evaluated by the DPS 226 and the RPB values for the cores 104 are updated accordingly. As previously described, the RPB values may have any suitable format (e.g., ranked, binned, normalized, scaled, etc.). At next block 320, the power controller 202 uses the RPB values to determine an optimal redistribution of available or additional power. Redistribution may include reducing the power provided to some devices and increasing the power to other devices while maintaining about the same overall power level. When a higher performance mode is indicated in which additional power up to the TDP factor may be used, redistribution may be include distributing additional power to one or more of the devices with higher RPB values and may still include reducing power provided to those devices with lower RPB values.

At next block 322, the DPS 226 updates the VC, FC, and FDx values based on the MD, AP. APCEx and RPB values. Operation then loops back to block 304 to wait for expiration of the current polling interval. Operation may repeat for successive polling intervals until next POR. It is noted that the DPM 120 may be available to perform other functions and operations while waiting for expiration of the current polling interval.

Figure 4:
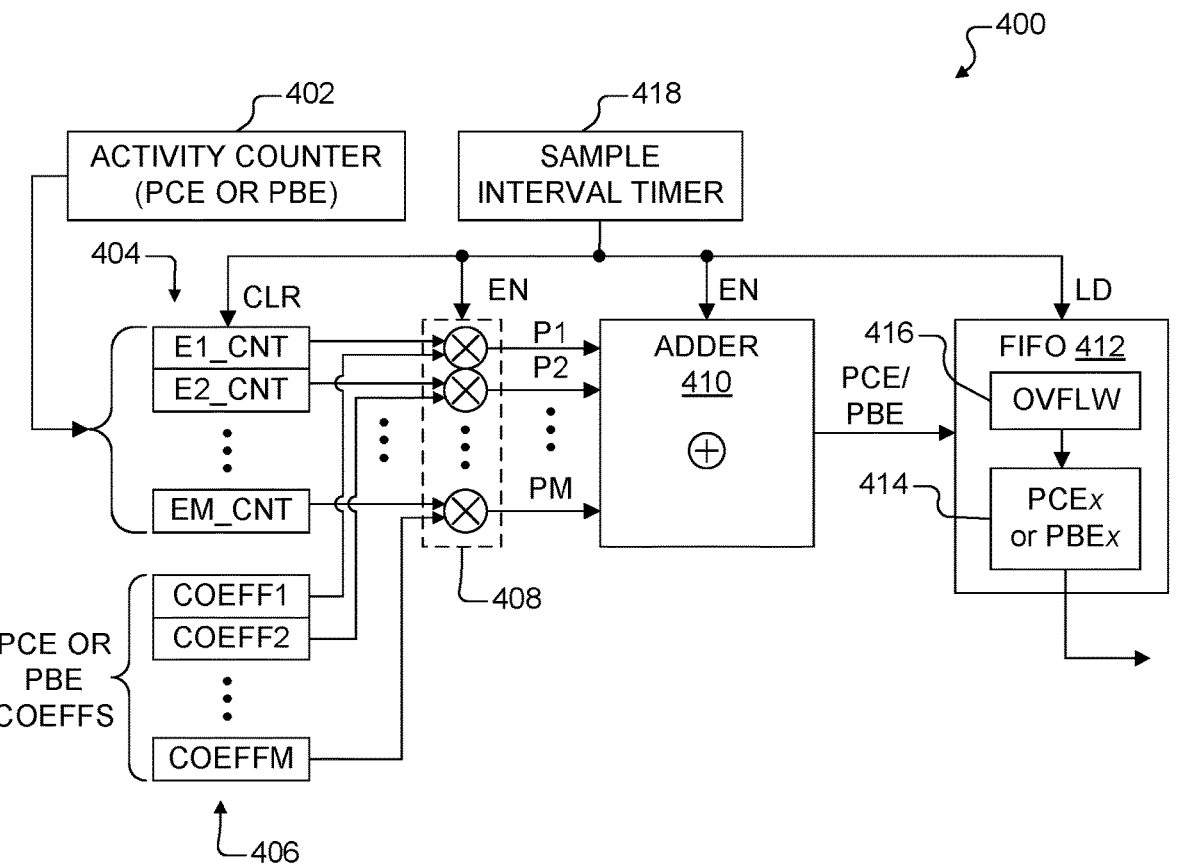
FIG. 4 is a simplified bock diagram of an activity monitor implemented according to one embodiment which may be used as any one or more of the activity monitors of FIG. 1.

FIG. 4 is a simplified bock diagram of an activity monitor 400 implemented according to one embodiment which may be used as any one or more of the activity monitors 108 of the cores 104. The activity monitor 400 is used either for tracking power consumption estimate events or performance benefit estimate events that occur in each of the cores 104, in which the activity monitor 400 may be duplicated within each core for tracking both. An activity counter 402 is provided for tracking either PCE or PBE events that are configured to increment corresponding event counters 404. There are M counters 404 individually labeled E1_CNT, E2_CNT, . . . , EM_CNT for counting a corresponding M events E1, E2, . . . , EM. For power consumption estimation, the events are selected that have been determined to have the greatest correlation with power consumption, in which the number M may be determined empirically to include a practicable number of events that collectively indicate power consumption at any given time. Similarly, for performance benefit estimation, the events are selected that have been determined to have the greatest correlation with performance benefit or power efficiency, in which the number M may be determined empirically to include a practicable number of events that collectively indicate relative performance benefit and power efficiency at any given time. It is noted that although the same number M is shown for the general configuration, the number of PCE events may be different from the number of PBE events (in other words, M may be different for PCE and PBE).

During a given sampling interval, the activity counter 402 detects any one or more of the M events and increments the corresponding one or more of the counters 404 for each clock cycle. It is possible that every event may occur during any given clock cycle, in which case each of the counters 404 is incremented during that clock cycle. In addition, some events may have multiple occurrences at any given time, such as one or more counts during a given clock cycle, in which the corresponding counter is incremented by the same number of counts for the given clock cycle. Thus, for example, if event E1 counts a number Ops decoded and dispatched in which the number of dispatches may be 0 to 4, then if 4 dispatches occur in a given clock cycle, then the counter E1_CNT is increased by 4 for that clock cycle.

A set of M coefficients 406 are provided, individually labeled COEFF1, COEFF2, . . . , COEFFM, including a corresponding one coefficient for each of the M events E1-EM. Generally, each coefficient serves as a weighting factor for the corresponding event so that each of the M events may be given different weighting factors empirically determined beforehand. A first set of coefficients are provided for the PCE events and a second set of coefficients are provided for the PBE events, in which a first number of PCE coefficients is the same as the first number of PCE events, and a second number of PBE is the same as the second number of PBE events, in which the first and second numbers may be the same or different depending upon the particular configuration.

A set of M multipliers 408 are included, one for each event. When enabled, each of the multipliers 408 multiplies the count in a corresponding one of the M event counters 404 by a corresponding one of the M coefficients 406 and output a corresponding one of P products P1, P2, . . . , PM. When enabled, a digital adder 410 adds the M products P1-PM and outputs a corresponding PCE or PBE value to a first-in, first out (FIFO) buffer 412. The adder 410 may be implemented in any suitable manner, such as, for example, a carry save adder (CSA) tree and a carry save propagate (CSP) tree which collectively adds multiple values together in one or two clock cycles. The FIFO buffer 412 includes a head register 414 and a tail register 416. The head register 414 is a corresponding one of the MMRs 106 for storing a corresponding one of the PCEx or PBEx values available to be read by the DPM 120. The tail register 416 is provided to store a next PCE or PBE value as an overflow value OVFLW when the head register 414 stores a valid value from the last sampling interval that has not yet been read by the DPM 120.

A sampling interval timer 418 is loaded with a corresponding one of the PCESINV or PBESINV values depending upon which of the PCE or PBE events are being monitored. Each time that the sampling interval timer 418 times out, it enables the multipliers 408 and the adder 410 by asserting an enable (EN) signal, loads the FIFO buffer 412 by asserting a load (LD) signal, and clears the counters

404 by asserting a clear (CLR) signal. It is noted that the CLR, EN and LD signals may be implemented by the same signal.

During normal operation, during each successive sampling interval, the activity counter 402 detects the up to M events and increments the corresponding M counters 404. Upon timeout of the sampling interval timer 418, the multipliers 408 and the adder 410 are enabled so that the count in each of the counters 404 is multiplied by a corresponding one of the coefficients 406 to generate the M products P1-PM, which are added together by the adder 410 to generate a total for the sampling interval as the PCE or PBE value which is loaded into the FIFO buffer 412. In addition, the counters 404 are cleared in a seamless manner and the sampling interval timer 418 is reloaded and restarted in a seamless manner so that the activity counter 402 continues to count events and increment the counters 404 for the next sampling interval without interruption.

When the head register 414 is read by the DPM 120, it is cleared or otherwise invalidated to be available for storing the next total value for the next sampling interval. Assuming that the DPM 120 polls the head register 414 at least as often as the sampling interval (e.g., POLL_INV≤PCESINV or POLL_INV≤PBESINV), then each new PCE or PBE value may be loaded directly into the head register 414 so that the tail register 416 remains unused for those sampling intervals. When, however, the head register 414 contains a valid value from the last sampling interval since it has not yet been read by the DPM 120, then the PCE or PBE total value is loaded into the tail register 416 instead. When a valid value is in the tail register 416 when the head register 414 is next read by the DPM 120, then the value in the tail register 416 is loaded into the head register 414 and the tail register 416 is cleared or otherwise invalidated. In this manner, a two-entry FIFO is sufficient for most configurations assuming that the polling interval is set at least as often as the sampling intervals for both PCE and PBE values. An overflow procedure may be performed if and when a new PCE or PBE value is generated when the FIFO buffer 412 is full, but such is not described herein.

The activity monitor 400 illustrates a system and method for performing a dot product computation in which events are counted during successive sampling intervals, and then multiplied by corresponding coefficients (or weighting factors) to generate a series of products that are summed together and stored into the corresponding MMR register to be read by the DPM 120. It is appreciated, however, that the sampling interval, even if relatively short, may incorporate hundreds of thousands of core cycles so that the count values in the counters 404 may be relatively large. The multipliers 408 and the adder 410 may thus need to be configured to handle relatively large numbers. In addition, the MMRs 106 storing the PCE and PBE values may need to be relatively large, such as, for example, up to 40 bits each.

Several optimizations are contemplated. Rather than accumulate counts for an entire sampling interval, the counts are only accumulated each clock cycle or a limited or small number of clock cycles. The multipliers 408 and the adder 410 are thus enabled multiple times per sampling interval and may thus be configured to handle significantly smaller values. A large counter (not shown) may be provided between the adder 410 and the FIFO buffer 412 accumulates a running total for each sampling interval. In addition, rather than loading the entire contents of the large counter into the FIFO buffer 412, a selected number of the upper bits may instead be loaded effectively rounding down the total count per sampling interval. For example, only the upper 28 bits of a 40-bit counter are loaded into the registers of the FIFO buffer 412. Although some information is lost, the size of the transferred information is substantially larger than the truncated information (such as by a factor of 100 or more), so that the end result is acceptable.

It is appreciated that over time and corresponding sequential sampling intervals the activity monitor 400 generates a sequential series of PCEx or PBEx values that are retrieved by the DPM 120 and used as update values to update corresponding ones of the moving averages shown at 214 or 216, respectively.

Figure 5:
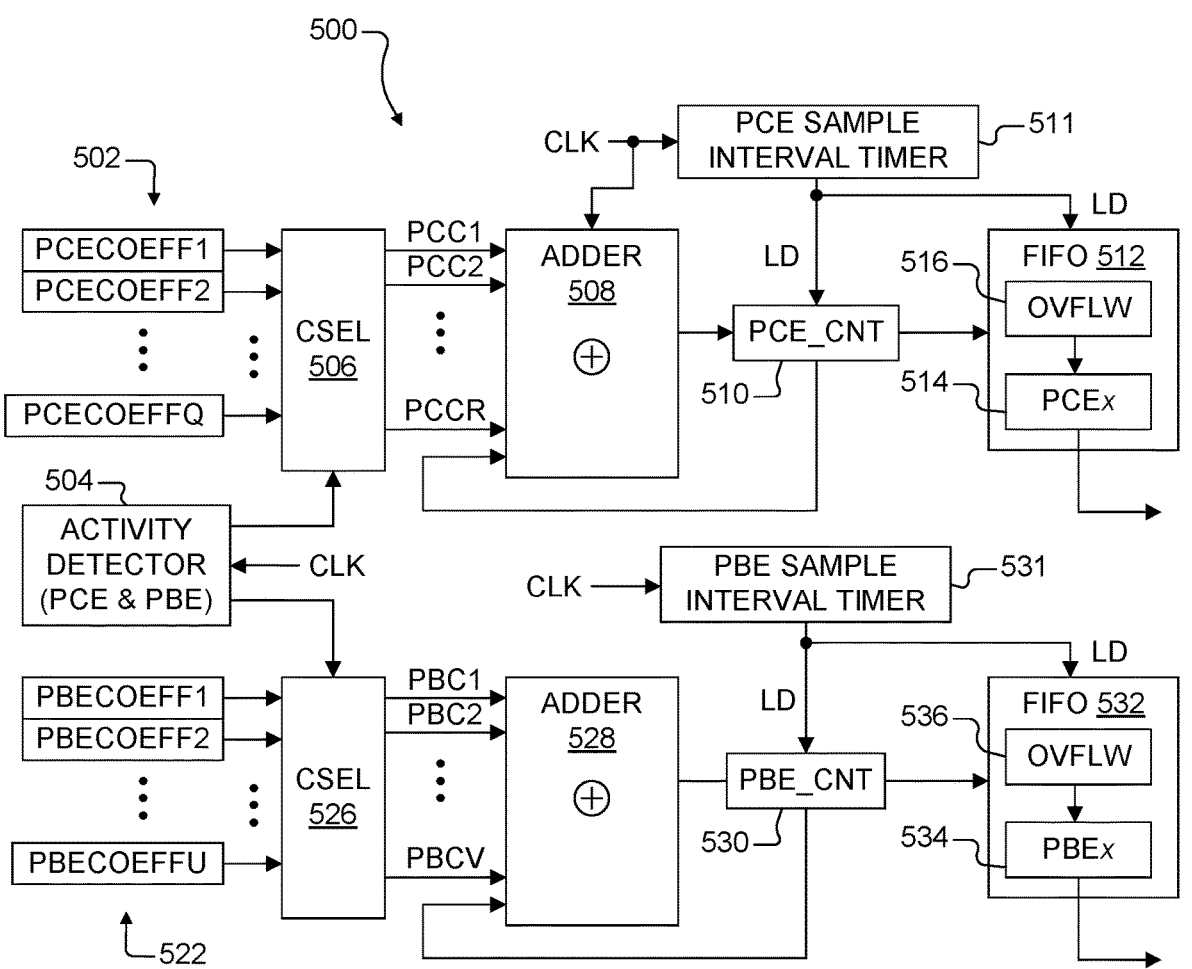
FIG. 5 is a simplified bock diagram of another activity monitor implemented according to another embodiment which may be used as any one or more of the activity monitors of FIG. 1.

FIG. 5 is a simplified bock diagram of an activity monitor 500 implemented according to another embodiment which may be used as any one or more of the activity monitors 108 of the cores 104. The activity monitor 500 is used either for tracking both of the power consumption estimate events and the performance benefit estimate events that occur in each of the cores 104. The power consumption estimate coefficients PCECOEFFS are shown at 502 including Q coefficients, individually labeled PCECOEFF1, PCECOEFF2, . . . , PCECOEFFQ, in which Q is determined empirically to include a coefficient for each of a set of Q events that have the greatest correlation with power consumption as previously described. An activity detector 504 is provided for detecting both PCE and PBE events. The activity detector 504 receives a clock signal CLK which is based on the clock signal CLK provided to the multi-core processor 102. The activity detector 504 prompts a coefficient selector (CSEL) 506 to select zero or more up to all of the Q coefficients for each CLK cycle, in which the CSEL 506 outputs a set of R selected power consumption coefficient values individually labeled PCC1, PCC2, . . . , PCCR. In this case, CSEL 506 may select some of the coefficients more than once and may even select multiples of a given coefficient in any given CLK cycle as further described herein. For this reason, the CSEL 506 may output up to R of the PCC1-PCCR coefficient values in which R≥Q.

The PCC1-PCCR coefficient values are provided to respective inputs of a digital adder 508. The adder 508 operates in substantially the same manner as the adder 410, such as incorporating CSA and CSP trees or the like, by summing its inputs and outputting a sum that is loaded into a counter 510. The PCE count (PCE_CNT) value stored in the counter 510 is fed back to another input of the adder 508. For each CLK cycle, new PCC1-PCCR coefficient values are added to the accumulated PCE_CNT value in the counter 510 during a PCE sampling interval. A PCE sampling interval timer 511, which has been previously loaded with the PCESINV value, tracks the sampling interval for counting PCE events. Each time that the sampling interval timer 511 times out, it asserts a load (LD) signal to load the FIFO buffer 512 with the PCE_CNT value stored in the counter 510, or a portion thereof, and also to load the counter 510 with any new sum from the adder 508 in a seamless and uninterrupted manner in the same CLK cycle.

The FIFO buffer 512 includes a head register 514 operating as the corresponding MMR register 106 holding the next PCEx value and a tail register 516 holding any overflow value OVFLW for the PCE count, and operates in substantially the same way as the FIFO buffer 412 previously described. Thus, the PCE_CNT value is loaded into the head register 514 when available (empty or invalid), or is loaded into the tail register 514 when the head register 514 still holds a valid value from the last sampling interval. When a valid value is in the tail register 516 when the head register 514 is next read by the DPM 120, then the value in the tail register 516 is loaded into the head register 514 and the tail register 516 is cleared or otherwise invalidated.

The performance benefit estimate coefficients PBECO-EFFS are shown at 522 including U coefficients, individually labeled PBECOEFF1, PBECOEFF2, . . . , PBECO-EFFQ, in which U is determined empirically to include a coefficient for each of a set of U events that have the greatest correlation with performance benefit or power efficiency as previously described. The PBE portion of the activity counter 500 includes substantially similar elements that operate in substantially the same manner, in which the activity detector 504 also tracks PBE events. The PBE portion includes a coefficient selector (CSEL) 526, an adder 528, a counter 530 for storing a PBE count (PBE_CNT) value, a PBE sampling interval timer 531 which has been previously loaded with the PBESINV value, and a FIFO buffer 532 including a head register 534 operating as the corresponding MMR register 106 holding the next PBEx value, and a tail register 536 holding any overflow value OVFLW for the PBE count.

The activity detector 504 prompts CSEL 526 to select zero or more up to all of the U coefficients for each CLK cycle, in which CSEL 526 outputs a set of V selected performance benefit coefficient values individually labeled PBC1, PBC2, . . . , PVCV. As with the CSEL 506, the CSEL 526 may select some of the coefficients more than once and may even select multiples of a given coefficient in any given CLK cycle. For this reason, the CSEL 526 may output up to V of the PBC1-PBCV coefficient values in which V≥U. The PBC1-PBCV coefficient values are provided to respective inputs of the adder 528, which sums its inputs and outputs a sum that is loaded into the counter 530. The PBE_CNT value stored in the counter 530 is fed back to another input of the adder 528, in which new PBC1-PBCV coefficient values are added to the accumulated PBE_CNT value in the counter 530 for each CLK cycle during a PBE sampling interval. Each time that the PBE sampling interval timer 531 times out, it asserts a signal LD to load the FIFO buffer 532 with the PBE_CNT value stored in the counter 530, or a portion thereof, and also to load the counter 530 with any new sum from the adder 538 in a seamless and uninterrupted manner in the same CLK cycle. The FIFO buffer 532 operates in substantially the same manner as the FIFO buffer 512 previously described for storing and providing the corresponding PBEx value in the corresponding one of the MMRs 106.

In one embodiment, each of the coefficients PCECO-EFF1-PCECOEFFQ and PBECOEFF1-PBECOEFFQ are signed 13-bit scaling coefficients, the counters 510 and 530 are each 40-bit signed counters, and the registers 514 and 534 are each 28-bit registers that are loaded with the upper 28 bits of the respective one of the counters 510 530. In one embodiment, PCESINV and PCESINV may each be loaded with a value indicative of the respective sampling intervals measured in milliseconds (ms), such as 1 ms, 2 ms, 4 ms, 8 ms, 16 ms, 32 ms, 64 ms, etc.

It is appreciated that over time and corresponding sequential sampling intervals the activity monitor 500 generates a sequential series of PCEx and PBEx values that are retrieved by the DPM 120 and used as update values to update corresponding ones of the moving averages shown at 214 and 216, respectively.

Figure 6:
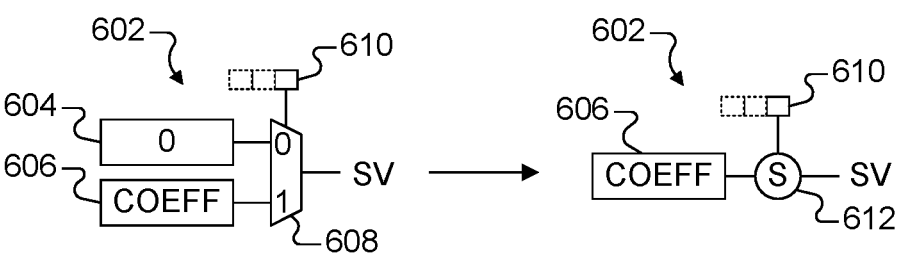
FIG. 6 is a simplified schematic diagram of a singular selector cell that may be used within each of the coefficient selectors of FIG. 5 according to one embodiment.

FIG. 6 is a simplified schematic diagram of a singular selector cell 602 that may be used within each of the CSELs 506 and 526 according to one embodiment. The singular selector cell 602 is suitable when a corresponding coefficient may have a count value of either 0 or 1. A zero register 604 has the same size as each of the coefficients in which each bit is zero. A coefficient register 606 represents a corresponding one of the coefficients PCECOEFF1-PCECO-EFFQ and PBECOEFF1-PBECOEFFQ. The output of the zero register 604 is provided to the "0" input of a 2-input multiplexer (MUX) 608, and the output of the coefficient register 606 is provided to the "1" input of the MUX 608. A select value 610 represents the least significant bit (LSB) of a select value provided by the activity detector 504 to the select input of the MUX 608 for selecting the corresponding coefficient. The MUX 608 has an output providing a selected value, which represents a corresponding one of the PCC1-PCCR or PBC1-PBCV coefficient values.

In operation of the singular selector cell 602, when the select value 610 is "0" the output of the zero register 604 is selected so that SV=0, or a zero-valued coefficient (meaning that the coefficient in the coefficient register 606 is not selected). When the select value 610 is "1" the output of the coefficient register 606 is selected so that SV=COEFF, which means that the corresponding coefficient is selected and provided to a corresponding input of either one of the adders 508 or 528. The singular selector cell 602 may be simplified using a singular selector cell symbol 612 having a first input receiving COEFF at the output of the coefficient register 606, having a second input receiving the select value 610, and having a output providing the SV value. Operation is identical.

Figure 7:
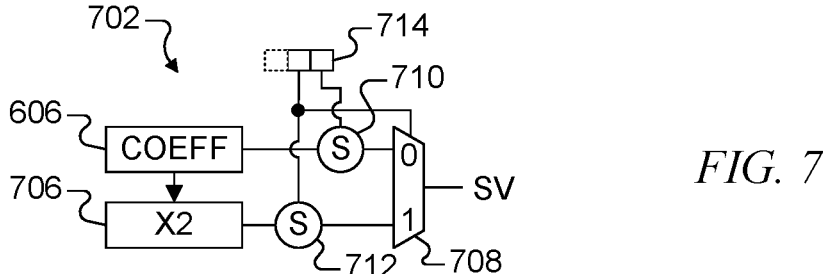
FIG. 7 is a simplified schematic diagram of a doubler selector cell that may be used within each of the coefficient selectors of FIG. 5 according to one embodiment.

FIG. 7 is a simplified schematic diagram of a doubler selector cell 702 that may be used within each of the CSELs 506 and 526 according to one embodiment. The doubler selector cell 702 is suitable when a corresponding coefficient may have a count value of 0, 1, or 2. The coefficient register 606 providing the corresponding coefficient has an output coupled to a first singular selector cell 710, which has an output coupled to the "0" input of a 2-input MUX 708. A doubling (or X2) register 706 stores twice the value of the corresponding coefficient, which may be determined simply copying COEFF from the coefficient register 606 and left-shifting by 1 bit. Thus, the doubling register 706 represents 2×COEFF (in which "X" denotes multiplication). The output of the doubling register 706 is coupled to an input of a second singular selector cell 712, which has an output coupled to the "1" input of the MUX 708. A select value 714 represents the 2 LSBs of a select value provided by the activity detector 504. The first LSB (or right-most bit) is provided to the other input of the first singular selector cell 710, and the next or second LSB is provided to the other input of the second singular selector cell 712 and to the select input of the MUX 708. The output of the MUX 708 provides the selected value.

In operation of the doubler selector cell 702, when the select value 714 is "00", the outputs of both of both singular selector cells 710 and 712 is zero so that SV=0, meaning that the corresponding coefficient COEFF is not selected. When the select value 714 is "01", then the COEFF from the coefficient register 606 is output from the singular selector cell 710 and selected by the MUX 708 so that SV=COEFF. When the select value 714 is "10", then the output of the doubling register 706 is output from the singular selector cell 712 and selected by the MUX 708 so that SV=2× COEFF. In this case a select value of "11" is not valid, but nonetheless provides SV=2×COEFF.

Figure 8:
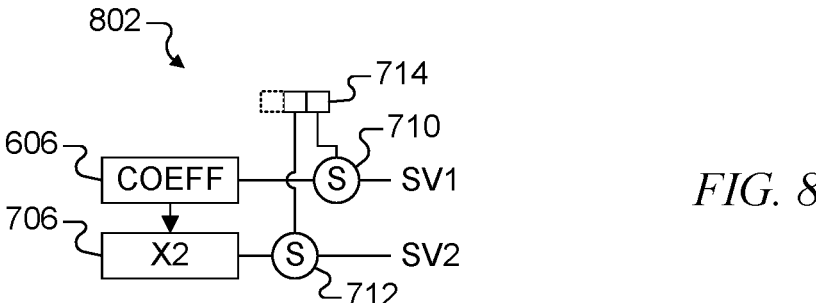
FIG. 8 is a simplified schematic diagram of a dual selector cell that may be used within each of the coefficient selectors of FIG. 5 according to one embodiment.

FIG. 8 is a simplified schematic diagram of a dual selector cell 702 that may be used within each of the CSELs 506 and 526 according to one embodiment. The dual selector cell 802 is suitable when a corresponding coefficient may have a count value of 0-3. The dual selector cell 802 is similar to the doubler selector cell 702 and includes the coefficient register 606, the doubling register 706, the singular selector cells 710 and 712, and the select value 714 coupled to operate in similar manner. The MUX 708 is eliminated and two SV outputs are provided, SV1 and SV2. When used in either of the CSELs 506 and 526, a corresponding coefficient provided to one input of CSEL generates the two outputs SV1 and SV2 provided to respective inputs of the subsequent adder 508 or 528.

In operation of the dual selector cell 802, when the select value 714 is "00", the outputs of both of both singular selector cells 710 and 712 is zero so that SV1=0 and SV2=0, meaning that the corresponding coefficient COEFF is not selected. When the select value 714 is "01", then the COEFF from the coefficient register 606 is output from the singular selector cell 710 as SV1=COEFF, and the output from the singular selector cell 712 is zero so that SV2=0. When the select value 714 is "10", then the output of the singular selector cell 710 is zero so that SV1=0, and the output from the singular selector cell 712 is 2×COEFF so that SV2=2× COEFF. When the select value 714 is "11", then the output of the singular selector cell 710 is COEFF so that SV1=COEFF, and the output from the singular selector cell 712 is 2×COEFF so that SV2=2×COEFF. In this case, it is noted that a select value of "11" represents 3×COEFF output as a combination of 2 outputs COEFF and 2×COEFF.

Figure 9:
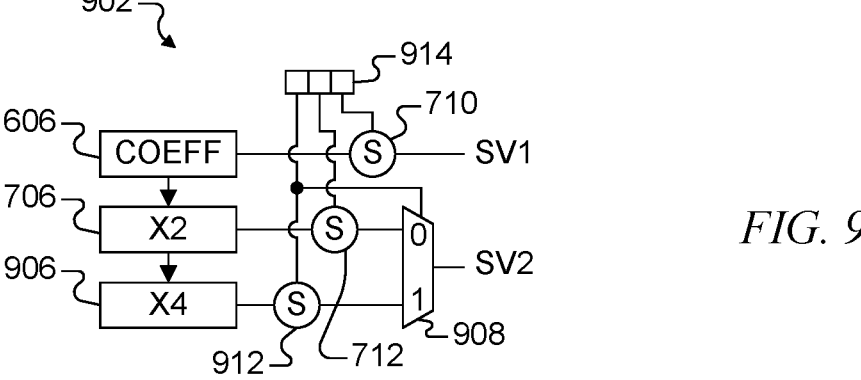
FIG. 9 is a simplified schematic diagram of a quad selector cell that may be used within each of the coefficient selectors of FIG. 5 according to one embodiment.

FIG. 9 is a simplified schematic diagram of a quad selector cell 902 that may be used within each of the CSELs 506 and 526 according to one embodiment. The quad selector cell 902 is suitable when a corresponding coefficient may have a count value of 0-5 and outputs two select values SV1 and SV2. The quad selector cell 902 includes the coefficient register 606, the doubling register 706, a quad register 906, singular selector cells 710, 712, and 912, a 2-input MUX 908, and a 3-bit select value 914. The output of the coefficient register 606 holding COEFF is provided to the input of the singular selector cell 710, having an output providing SV1. The output of the doubling register 702 holding 2×COEFF is provided to the input of the singular selector cell 712, having an output coupled to the "0" input of the MUX 908. A quad (or X4) register 906 stores four times the value of the corresponding coefficient, which may be determined simply copying 2×COEFF from the doubling register 706 and left-shifting by 1 bit (or by copying COEFF and left-shifting by 2 bits) to provide a value 4×COEFF. The output of the quad register 906 holding 4×COEFF is provided to the input of the singular selector cell 912, having an output coupled to the "1" input of the MUX 908. The three bits of the selector value 914 from right to left are provided to the other inputs of the singular selector cells 710, 712, and 912, respectively. The left-most bit of the selector value 914 is provided to the select input of the MUX 908.

In operation of the quad selector cell 902, when the select value 914 is "000", the outputs of the singular selector cells 710, 712, and 912 are zero so that SV1=0 and SV2=0, meaning that the corresponding coefficient COEFF is not selected. When the select value 914 is "001", then the COEFF from the coefficient register 606 is output from the singular selector cell 710 as SV1=COEFF, and the output from the singular selector cell 712 is zero so that SV2=0. When the select value 914 is "010", then the output of the singular selector cell 710 is zero so that SV1=0, and the output from the singular selector cell 712 is 2×COEFF so that SV2=2×COEFF. When the select value 914 is "011", then the output of the singular selector cell 710 is COEFF so that SV1=COEFF, and the output from the singular selector cell 712 is 2×COEFF so that SV2=2×COEFF. When the select value 914 is "100", then the output of the singular selector cell 710 is zero so that SV1=0, and the output from the singular selector cell 912 providing 4×COEFF is selected so that SV2=4×COEFF. When the select value 914 is "101", then the output of the singular selector cell 710 is COEFF so that SV1=COEFF, and the output from the singular selector cell 912 providing 4×COEFF is selected so that SV2=4×COEFF. In this case, it is noted that a select value of "011" represents 3×COEFF output as a combination of 2 outputs COEFF and 2×COEFF, and a select value of "101" represents 5×COEFF output as a combination of 2 outputs COEFF and 4×COEFF.

It is appreciated that modification of the quad selector cell 902 may be made to generate values up to 7, and that additional select circuitry may be added to generate higher values if desired in a given configuration.

FIG. 10 is a tabular diagram listing an exemplary set of PCE events that may be monitored and counted for determining a power consumption estimate for each of the cores 104 according to one embodiment. The tabular diagram includes a PCE event number, an event name or mnemonic, and an event description. Preliminary testing may be conducted on the multi-core processing system 100 to identify those events which have the greatest correlation with power consumption. The illustrated set of PCE events includes 10 events numbered C1-C10, in which it is understood that any suitable number of PCE events, more or less than 10, may be included in different configurations.

The preliminary testing is also performed to identify the relative level of correlation for determining values for each of the corresponding set of power consumption estimate coefficients PCECOEFFS. The set of PCECOEFFS coefficients are used as weighting factors that are empirically determined during testing to achieve an accurate determination of overall power consumption at any given time during operation. It is noted that the events C1-C10 are simply counts of the corresponding events, in which the actual impact on power consumption for any given event is reflected by the corresponding coefficient used as a weighting factor for that event.

A first event C1 with event name FBLKP is associated with a front-end prediction unit (PRU) that performs branch prediction to predict blocks of instructions to be fetched per clock cycle. FBLKP indicates whether the fetch block was correctly predicted and is either 0 or 1.

A second event C2 with event name FBLK2 is a subset of FBLKP which indicates that the fetch block is fetched from the level 2 instruction cache IL2 as opposed to being accessed from the level 0 instruction cache IL0. FBLK2 is either 0 or 1. In one embodiment, each of the cores 104 includes a set of instruction and data caches. For instructions, each core 104 does not include a level 1 cache (e.g., IL1) but instead includes a relatively large IL2 and a relatively small IL0, in which IL0 is a subset of IL2 and is included to save power. A block of instructions fetched from IL0 consumes less power than when fetched from IL2. For data, each core may include a standard-sized level 1 data cache (DL1) and a relatively large level 2 data cache (DL2). It is noted that the level 2 cache may not be unified (including both instructions and data) but is separated into IL2 and DL2. Alternative configurations may include separate level 1 instruction and data caches (IL1 and IL2) and a unified level 2 cache. In one embodiment, at least one unified level 3 cache is provided for all of the cores 104, or separate L3 caches are provided for each of one or more clusters of cores. A cluster is a subgroup of the N cores.

A third event C3 with event name NOPS indicates a number of micro-ops, or simply "Ops", that have been decoded and dispatched to a scheduler. In one embodiment, instructions fetched from memory are first decoded into one or more Ops that are then dispatched to a scheduler to ultimately be issued for execution. In one embodiment, up to 4 Ops may be dispatched to a scheduler so that NOPS can be any value from 0 to 4. The type of instructions depends upon the particular architecture. In one embodiment, for example, the instructions may be RISK-V instructions which is an open standard instruction set architecture (ISA). It is understood, however, that many different types of architectures may be used in various configurations.

A fourth event C4 with event name IRBXOP indicates a number of register or branch instruction Ops that are issued from an integer execution unit (IXU) scheduler for execution. IRBXOP can be any value from 0 to 4.

A fifth event C5 with event name ILOP indicates a number of load Ops that are issued from a load-store unit (LSU). ILOP can be any value from 0 to 4.

A sixth event C6 with event name ISOP indicates a number of store Ops that are issued from the LSU. ILOP can be any value from 0 to 4.

A seventh event C7 with event name IRBFOP indicates a number of register or branch instruction Ops that are issued from a floating-point execution unit (FPU) scheduler for execution. IRBXOP can be any value from 0 to 2.

An eight event C8 with event name ORISC indicates an IL2 or a DL2 cache miss resulting in an outbound cache fill request an inbound snoop. ORISC is an aggregate of outbound requests from IL2 and DL2 as well as inbound snoops. IRISC is 0 or 1.

A ninth event C9 with event name DL2PRP indicates that a DL2 pipeline request has been processed. Such requests include hit/miss determinations, tag lookup, way selection, etc., and can consume memory power in a core. DL2PRP is 0 or 1.

A tenth event C10 with event name TWP indicates a number of table walk processes that have been initiated by a table walk engine (TWE). In the event of a translation lookaside buffer (TLB) miss, the core "walks" page tables and the like to return entries into TLBs. TWP can be any value from 0 to 2.

FIG. 11 is a tabular diagram listing an exemplary set of PBE events that may be monitored and counted for determining a performance benefit estimate for each of the cores 104 according to one embodiment. The tabular diagram includes a PBE event number, an event name or mnemonic, and an event description. In a similar manner described for the PCE events, preliminary testing is performed to identify those events which have the greatest correlation with power efficiency and performance benefit that may be achieved with an increase in power. The illustrated set of PBE events includes 10 events numbered B1-B10, in which it is understood that any suitable number of PBE events, more or less than 10, may be included in different configurations.

The preliminary testing is also performed to identify the relative level of correlation for determining values for each of the corresponding set of performance benefit estimate coefficients PBECOEFFS. The set of PBECOEFFS coefficients are used as weighting factors that are empirically determined during testing to achieve an accurate determination of performance benefit that may be achieved at any given time during operation. It is noted that the coefficients may be positive or negative depending upon their relative impact on predicting performance benefit. It is noted that the events B1-B10 are simply counts of the corresponding events, in which the actual impact on performance benefit for any given event is reflected by the corresponding coefficient used as a weighting factor for that event.

A first event B1 with the event name FBLKP is the same as the PCE event C1 previously described. FBLKP indicates whether the fetch block was correctly predicted and is either 0 or 1.

A second event B2 with the event name NOPS is the same as the PCE event C3 previously described. NOPS indicates a number of micro-ops, or simply "Ops", that have been decoded and dispatched to a scheduler, and has any value from 0-4.

A third event B3 with event name ABORT indicates that an abort has been initiated including front end and back end aborts. An abort may be initiated because of branch misprediction or a variety of other reasons. During an abort process, the core has to throw away work that was speculatively done, has to flush part of the pipes, and then has to restart the pipes. An abort generally represents a penalty in which the core is not doing useful work and thus may be a reflection of lack of work being performed by the core. An abort consumes many clock cycles. Nonetheless, ABORT may be positive since the core may benefit from a higher frequency.

A fourth event B4 with event name DL2WRP indicates a write-related pipeline request has been processed by DL2. DL2WRP provides an indication of how much work the core is doing, and is 0 or 1.

A fifth event B5 with event name DLRNWRP indicates a non-write-related pipeline has been processed by DL2, including demand and prefetch read requests and snoops. DL2NWRP is 0 or 1.

A sixth event B6 with event name TWP is the same as the PCE event C10 previously described. TWP indicates the number of table walk processes that have been initiated by the TWE and can be any value from 0 to 2.

A seventh event B7 with event name DL2CFWC indicates a cache fill from L3 or DL2 within a corresponding cluster of cores. DL2CFWC indicates a DL2 cache miss which generally incurs latency of the core. When going to the DL2 within the core or even to the L3 outside the core but within the cluster of cores, this indicates a medium latency event. DL2CFWC is 0 or 1.

An eight event B8 with event name DL2CFNWC indicates a cache fill from external memory outside the corresponding cluster of cores. DL2CFNWC is similar to DL2CFWC and indicates a DL2 cache miss, except that the cache fill incurs a significantly greater latency since accessing memory that is external to the multi-core processor 102 or the multi-core processing system 100, such as a dynamic random access memory (DRAM). DL2CFNWC is either 0 or 1.

A ninth event B9 with event name IL2CFWC indicates a cache fill of IL2 from L3 or DL2 within a corresponding cluster of cores. IL2CLFW indicates an IL2 cache miss which generally incurs latency of the core. When going to the IL2 within the core or even to the L3 outside the core but within the cluster of cores, this indicates a medium latency event. IL2CLFW is 0 or 1.

A tenth event B10 with event name IL2CFNWC indicates a cache fill of IL2 from external memory outside the cluster of cores. IL2CFNWC is similar to IL2CFWC and indicates an IL2 cache miss, except that the cache fill incurs a significantly greater latency since accessing external memory such as DRAM or the like. IL2CFNWC is either 0 or 1.

Figure 12:
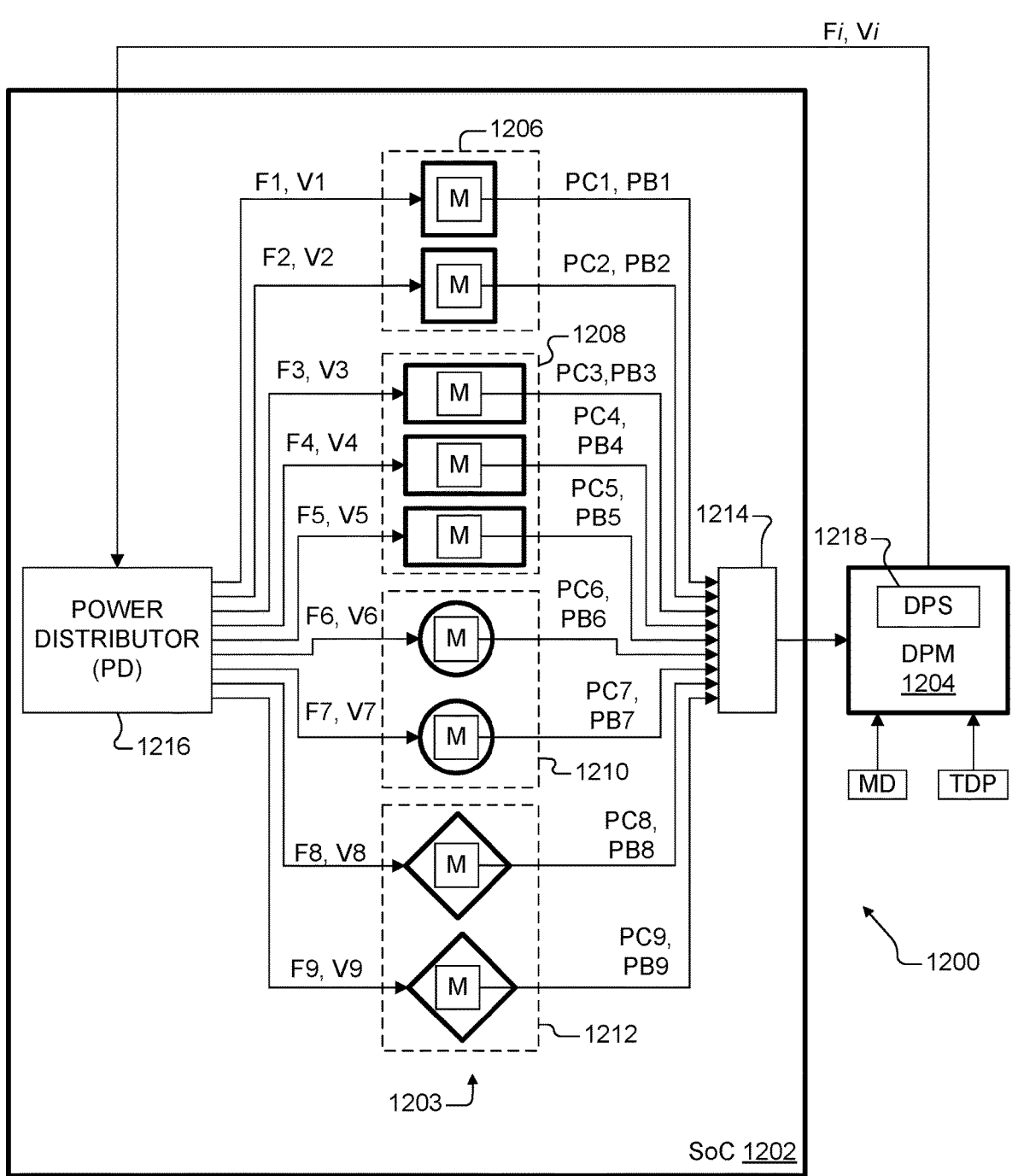
FIG. 12 is a simplified block diagram of a heterogenous processing system configured with differentiated power scaling based on relative power benefit estimation according to another embodiment.

FIG. 12 is a simplified block diagram of a heterogenous processing system 1200 configured with differentiated power scaling based on relative power benefit estimation according to another embodiment. The processing system 1200 includes a System on Chip (SoC) 1202 with multiple devices 1203 of various or different types and a differentiated power manager (DPM) 1204. The devices 1203 may include, for example, 0 or more devices of a first type 1206, 0 or more devices of a second type 1208, 0 or more devices of a third type 1210, 0 or more devices of a fourth type 1212, and so on for as many different types of power consuming devices 1203 that may be included. The phrase "0 or more" is intended to mean that some device types may be included while others are excluded so long as the SoC 1202 includes multiple devices 1203.

The multi-core processor 102 previously described represents a homogenous processing system with multiple cores 104 of essentially the same device type, whereas the processing system 1200 represents a heterogenous system with different types of power consuming devices 1203, such as cores and non-core devices including different types of processing devices (e.g., graphic devices), memory elements, controllers including microcontrollers, memory controllers, direct memory access (DMA) controllers, Ethernet controllers, etc. The various devices 1203 are represented as different shapes (e.g., squares, rectangles, circles, diamonds, etc.) to represent different device types.

Each of the power consuming devices 1203 may include an activity monitor denoted "M" which periodically or continuously monitors and accumulates power consumption (PC) events and performance benefit (PB) events during successive monitoring periods in a similar manner previously described. Each of the devices 1203 reports a corresponding set of PCi and PBi metrics to a memory 1214, which may be configured as a set of memory-mapped registers or the like as previously described. As shown, a first device of device type 1206 outputs metrics PC1 and PB1, a second device of device type 1206 outputs PC2 and PB2, a third device of device type 1208 outputs PC3 and PB3, and so on up to a last device of device type 1212 which outputs PC9 and PB9. Although 9 devices 1203 of various types are shown, it is understood any number of devices of any device type may be included. During operation, the DPM 1204 periodically retrieves the PCi and PBi metrics stored in the memory 1214, updates corresponding combined values (e.g., moving average values or the like), evaluates and/or scales the combined values for determining power consumption estimates and performance benefit estimates or the like overall and for each of the devices 1203, and updates and outputs a set of frequency and voltage control values Fi and Vi to a power distributor (PD) 1216. The PD 1216 distributes power among the devices 1203 of the SoC 1202 according to the Fi and Vi control values from the DPM 1204.

The PD 1216 is shown provided on the SoC 1202 and may include voltage and frequency regulators and generators and voltage and frequency dividers and the like. Alternatively, certain power generation or regulation may be provided off-chip whereas power distribution may be provided on-chip. For example, voltage regulators and frequency generators or the like may be provided off-chip, whereas voltage and frequency dividers and the like may be provided on-chip. Any suitable type of power distribution configuration is contemplated.

Generally, the PD 1216 adjusts frequency and/or voltage values to the devices 1206-1212 to control the relative amount of power provided to each of the devices 1203 in accordance with the Fi and Vi control values. As shown, F1 and V1 are provided to a first device of device type 1206, F2 and V2 are provided to a second device of device type 1206, F3 and V3 are provided to a first device of device type 1208, and so on up to F9 and V9, which are provided to a last device of device type 1212.

The DPM 1204 generally regulates overall power of the SoC 1202 and also controls relative distribution of power between the devices 1203 according to differentiated power scaling in a similar manner as the DPM 120. The DPM 1204 receives a mode (MD) value indicative of a desired operating mode, such as, for example, a normal mode, a low power mode, and a high performance mode (e.g., turbo mode), among other possible modes of operation. The DPM 1204 also receives a thermal design power (TDP) factor that identifies a maximum level of power (in terms of heat generated) in a similar manner as previously described. In general, the DPM 1204 periodically receives the PC values from the devices 1203 via the memory 1214 and performs accumulation and/or averaging and the like of the PC values as previously described. The DPM 1204 uses this information to determine an overall estimated power consumption level and adjusts the Fi and Vi control values accordingly in compliance with both the MD value and the TDP factor.

The DPM 1204 also periodically receives the PB values from the devices via the memory 1214 and performs accumulation and/or averaging and the like of the PB values in a similar manner as previously described. The DPM 1204 uses this information to determine a relative power distribution among the devices 1203 of the SoC 1202 according to differentiated power scaling. The DPM 1204 may include, for example, a differentiated power scaler (DPS) 1218 which operates in a similar manner as the DPS 226, except with the additional complication of distributing power among heterogenous device types. Differentiated power distribution among the heterogeneous devices 1203 is substantially similar to that of homogenous operation in which available power may be distributed unequally among devices of a given type for each provided group of devices of the same type. In addition, power may be distributed unequally between different device types depending upon the processing functions being performed. For example, additional power during a turbo mode may favor core devices during periods of heavy computational type processing, or may favor memory element and/or DMA controller devices during periods of substantial data transfer, or may favor communication devices during periods of substantial communication processing, etc.

In general, the DPM 1204 periodically receives and evaluates the PB values and performs differentiated power scaling, which essentially includes the ability to distribute or redistribute power on the basis of performance benefit determinations regardless of whether power is distributed equally or not. Differentiated power scaling may thus be used to identify those devices operating with greater power efficiency that would benefit the most from an increase in power, to identify those devices operating with the least power efficiency such that power may be decreased without significant negative impact on operation, and to identify those devices operating at a suitable power level such that power may remain unmodified.

The present description has been presented to enable one of ordinary skill in the art to make and use the present invention as provided within the context of particular applications and corresponding requirements. The present invention is not intended, however, to be limited to the particular embodiments shown and described herein, but is to be accorded the widest scope consistent with the principles and novel features herein disclosed. Many other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention.

The invention claimed is:

1. A power management system with differentiated power scaling, comprising:
   a plurality of devices;
   at least one activity monitor that is configured to count a plurality of performance benefit estimation events of each of the plurality of devices to determine a plurality of performance benefit estimate values each comprising a measure of relative power utilization efficiency of a corresponding one of the plurality of devices; and
   a differentiated power manager that is coupled to periodically evaluate the plurality of performance benefit estimate values and to dynamically adjust relative power provided to each of the plurality of devices to achieve differentiated power scaling based on the plurality of performance benefit estimate values;
   wherein each of the at least one activity monitor comprises:
      an activity detector that detects occurrences of the plurality of performance benefit estimation events during each clock cycle and that provides a corresponding plurality of detect signals indicative thereof;
      a selector that selects a number of detected ones of a plurality of coefficients based on the plurality of detect signals and that provides a selected number of coefficient values; and
      an adder that accumulates the selected number of coefficient values during each clock cycle into a counter that holds a corresponding one of a plurality of performance benefit estimate update values.

2. The power management system of claim 1, wherein the differentiated power manager is configured to distribute additional power during a higher performance mode of operation only to those of the plurality of devices with higher performance benefit estimate values.

3. The power management system of claim 2, wherein the differentiated power manager is further configured to decrease power provided to those of the plurality of devices with lower performance benefit estimate values to recapture a power amount and to redistribute the recaptured power amount to those of the plurality of devices with higher performance benefit estimate values during the higher performance mode of operation.

4. The power management system of claim 1, wherein the differentiated power manager is configured to redistribute a current level of available power by decreasing power provided to those of the plurality of devices with lower performance benefit estimate values while increasing power provided to those of the plurality of devices with higher performance benefit estimate values.

5. The power management system of claim 1, further comprising a timer that provides a signal to transfer the corresponding one of a plurality of performance benefit estimate update values accumulated in the counter into a corresponding one of a plurality of output registers for each of successive sample intervals.

6. The power management system of claim 1, wherein the differentiated power manager combines one of the plurality of performance benefit estimate update values with a corresponding one of the plurality of performance benefit estimate values during each of successive polling intervals.

7. The power management system of claim 1, wherein the differentiated power manager combines one of the plurality of performance benefit estimate update values with a corresponding one of the plurality of performance benefit estimate values according to a moving average function.

8. The power management system of claim 1, wherein the plurality of performance benefit estimation events of each of the plurality of devices are weighted and counted for each of sequential sampling intervals to provide a plurality of sequential series of performance benefit estimate update values including a sequential series of performance benefit estimate update values for each of the plurality of devices.

9. The power management system of claim 8, wherein each of the plurality of performance benefit estimate values comprises a moving average of a corresponding one of the plurality of sequential series of performance benefit estimate update values.

10. The power management system of claim 1, wherein the differentiated power manager normalizes the plurality of performance benefit estimate values based on a selected scale into normalized values and distributes available power based on the normalized values.

11. The power management system of claim 1, wherein the differentiated power manager groups the plurality of performance benefit estimate values into a plurality of bins from a lowest bin to a highest bin separated by at least one threshold and distributes available power based on binned information.

12. The power management system of claim 1, wherein the differentiated power manager ranks the plurality of performance benefit estimate values from lowest to highest and distributes available power based on ranked information.

13. The power management system of claim 1, wherein the plurality of devices comprises a plurality of cores of a multi-core system, and wherein the plurality of performance benefit estimation events comprises at least one event performed by a prediction unit.

14. The power management system of claim 1, wherein the plurality of devices comprises a plurality of cores of a multi-core system, and wherein the plurality of performance benefit estimation events comprises a number of micro-ops that have been decoded and dispatched for execution.

15. The power management system of claim 1, wherein the plurality of devices comprises a plurality of cores of a multi-core system, and wherein the plurality of performance benefit estimation events comprises an abort operation.

16. The power management system of claim 1, wherein the plurality of devices comprises a plurality of cores of a multi-core system, and wherein the plurality of performance benefit estimation events comprises at least one event associated with a table walk engine.

17. The power management system of claim 1, wherein the plurality of devices comprises a plurality of cores of a multi-core system, and wherein the plurality of performance benefit estimation events comprises at least one cache fill related event.

18. The power management system of claim 1, wherein each of the plurality of performance benefit estimation events are effectively multiplied by a corresponding one of a plurality of weighting coefficients that are predetermined for a given configuration and expected application.

19. The power management system of claim 1, wherein the plurality of devices include a plurality of non-core devices.

20. A method of managing power provided to a plurality of devices using differentiated power scaling, comprising:

counting a plurality of performance benefit estimation events of each of the plurality of devices for determining a plurality of performance benefit estimate values each comprising a measure of relative power utilization efficiency of a corresponding one of the plurality of devices, wherein the counting comprises:

detecting occurrences of the plurality of performance benefit estimation events during each clock cycle and providing a corresponding plurality of detect signals indicative thereof;

selecting a number of detected ones of a plurality of coefficients based on the plurality of detect signals and providing a selected number of coefficient values; and accumulating the selected number of coefficient values during each clock cycle into a counter that holds a corresponding one of a plurality of performance benefit estimate update values; and periodically evaluating the plurality of performance benefit estimate values and dynamically adjusting relative power provided to each of the plurality of devices to achieve differentiated power scaling based on the plurality of performance benefit estimate values.

21. The method of claim 20, wherein the dynamically adjusting comprises distributing additional power during a higher performance mode of operation only to those of the plurality of devices with higher performance benefit estimate values.

22. The method of claim 21, further comprising decreasing power provided to those of the plurality of devices with lower performance benefit estimate values to recapture a power amount; and redistributing the recaptured power amount to those of the plurality of devices with higher performance benefit estimate values during the higher performance mode of operation.

23. The method of claim 20, wherein the dynamically adjusting comprises redistributing a current level of available power by decreasing power provided to those of the plurality of devices with lower performance benefit estimate values while increasing power provided to those of the plurality of devices with higher performance benefit estimate values.

24. The method of claim 20, further comprising transferring the corresponding one of a plurality of performance benefit estimate update values accumulated in the counter into a corresponding one of a plurality of output registers for each of successive sample intervals.

25. The method of claim 20, further comprising combining one of the plurality of performance benefit estimate update values with a corresponding one of the plurality of performance benefit estimate values during each of successive polling intervals.

26. The method of claim 20, further comprising combining one of the plurality of performance benefit estimate update values with a corresponding one of the plurality of performance benefit estimate values during each of successive polling intervals according to a moving average function.

27. The method of claim 20, wherein the counting comprises counting and weighting the plurality of performance benefit estimation events of each of the plurality of devices for each of sequential sampling intervals for providing a plurality of sequential series of performance benefit estimate update values including a sequential series of performance benefit estimate update values for each of the plurality of devices.

28. The method of claim 27, wherein the determining each of the plurality of performance benefit estimate values comprises calculating a moving average of a corresponding one of the plurality of sequential series of performance benefit estimate update values.

29. The method of claim 20, further comprising:

normalizing the plurality of performance benefit estimate values based on a selected scale into normalized values; and distributing available power based on the normalized values.

30. The method of claim 20, further comprising:

grouping the plurality of performance benefit estimate values into a plurality of bins from a lowest bin to a highest bin separated by at least one threshold; and distributing available power based on binned information.

31. The method of claim 20, further comprising:

ranking the plurality of performance benefit estimate values from lowest to highest; and distributing available power based on ranked information.

* * * * *